US011537823B2

(12) United States Patent
Ida et al.

(10) Patent No.: US 11,537,823 B2
(45) Date of Patent: Dec. 27, 2022

(54) PROCESSING APPARATUS, PROCESSING METHOD, LEARNING APPARATUS, AND COMPUTER PROGRAM PRODUCT

(71) Applicant: KABUSHIKI KAISHA TOSHIBA, Minato-ku (JP)

(72) Inventors: Takashi Ida, Kawasaki (JP); Tenta Sasaya, Ota (JP); Wataru Watanabe, Koto (JP); Takayuki Itoh, Kawasaki (JP); Toshiyuki Ono, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 326 days.

(21) Appl. No.: 17/005,648

(22) Filed: Aug. 28, 2020

(65) Prior Publication Data
US 2021/0295110 A1    Sep. 23, 2021

(30) Foreign Application Priority Data

Mar. 18, 2020 (JP) .............................. JP2020-047114

(51) Int. Cl.
*G06K 9/62* (2022.01)
*G06T 7/00* (2017.01)
(Continued)

(52) U.S. Cl.
CPC ......... *G06K 9/6277* (2013.01); *G06K 9/6298* (2013.01); *G06N 3/04* (2013.01); *G06N 3/08* (2013.01); *G06T 7/0002* (2013.01)

(58) Field of Classification Search
CPC .. G06K 9/6277; G06K 9/6298; G06K 9/6284; G06K 9/6256; G06K 9/629;
(Continued)

(56) References Cited

U.S. PATENT DOCUMENTS 9,652,872 B2 * 5/2017 Jia .......................... A61B 6/545
9,996,890 B1 * 6/2018 Cinnamon ........... G06V 10/764
(Continued)

FOREIGN PATENT DOCUMENTS

JP    2019-71080 A    5/2019

OTHER PUBLICATIONS

He et al., "Deep Residual Learning for Image Recognition, 2016 IEEE Conference on Computer Vision and Pattern Recognition (CVPR)," Jun. 2016, 9 pages.

*Primary Examiner* — Michael S Osinski
(74) *Attorney, Agent, or Firm* — Oblon, McClelland, Maier & Neustadt, L.L.P.

(57) ABSTRACT

According to an embodiment, a processing apparatus includes a hardware processor. The hardware processor is configured to: cut out, from an input signal, a plurality of partial signals that are predetermined parts in the input signal; execute processing on the plurality of partial signals using neural networks having the same layer structure with each other to generate a plurality of intermediate signals including a plurality of signals corresponding to a plurality of channels; execute predetermined statistical processing on signals for each of the plurality of channels for each of the plurality of intermediate signals corresponding to the plurality of partial signals, to calculate statistics for each channel and generate a concatenated signal by concatenating the statistics of the plurality of respective intermediate signals for each channel; generate a synthetic signal by performing predetermined processing on the concatenated signal; and output an output signal in accordance with the synthetic signal.

14 Claims, 12 Drawing Sheets

(51) Int. Cl.
*G06N 3/04* (2006.01)
*G06N 3/08* (2006.01)

(58) Field of Classification Search
CPC .... G06K 9/6215; G06K 9/6267; G06K 9/627; G06K 9/628; G06K 9/6227; G06K 9/6232; G06N 3/04; G06N 3/08; G06N 3/0454; G06N 3/084; G06N 3/0481; G06N 3/02; G06N 3/088; G06T 7/0002; G06T 2207/20081; G06T 2207/20084; G06T 7/11; G06T 2207/10016; G06T 7/0012; G06T 2207/20021; G06T 2207/30096; G06T 5/50; G06T 7/73; G06V 10/454; G06V 10/764; G06V 10/82; G06V 20/52; G06V 10/25; G06V 10/40; G06V 10/806; G06V 40/171; G06V 40/172; G06V 10/44; G06V 10/50; G06V 20/56; G06V 20/46; G06V 20/58
See application file for complete search history.

(56) References Cited

U.S. PATENT DOCUMENTS

| | | | | |
|---|---|---|---|---|
| 10,249,042 | B2* | 4/2019 | Jung | G06V 10/82 |
| 10,776,911 | B2* | 9/2020 | Tamai | G06N 3/04 |
| 10,902,244 | B2* | 1/2021 | An | G06V 40/171 |
| 11,043,006 | B1* | 6/2021 | Mihal | G08G 1/16 |
| 11,436,474 | B2* | 9/2022 | Chabanne | G06F 21/32 |
| 2014/0010410 | A1* | 1/2014 | Sakurai | G06V 10/50 382/103 |
| 2016/0093050 | A1* | 3/2016 | Kim | G06T 7/32 382/128 |
| 2016/0217368 | A1 | 7/2016 | Ioffe et al. | |
| 2018/0089556 | A1* | 3/2018 | Zeiler | G06N 3/08 |
| 2018/0293429 | A1* | 10/2018 | Wechsler | G06V 10/454 |
| 2019/0311478 | A1* | 10/2019 | Avendi | G06V 10/82 |
| 2019/0347485 | A1* | 11/2019 | Yang | G06V 20/46 |
| 2019/0385024 | A1* | 12/2019 | Croxford | G06V 10/40 |
| 2020/0012942 | A1 | 1/2020 | Ioffe et al. | |
| 2020/0057924 | A1 | 2/2020 | Ioffe et al. | |
| 2020/0160043 | A1* | 5/2020 | Yamada | G06V 40/103 |
| 2020/0356840 | A1* | 11/2020 | Chabanne | G06F 21/32 |
| 2020/0402221 | A1* | 12/2020 | Ijiri | G06N 3/08 |
| 2021/0012128 | A1* | 1/2021 | Wang | G06V 10/454 |
| 2021/0027081 | A1* | 1/2021 | Zhang | G06V 40/45 |
| 2021/0027497 | A1* | 1/2021 | Ding | G06K 9/6215 |
| 2021/0034836 | A1* | 2/2021 | Haimovitch-Yogev | G06V 40/19 |
| 2021/0133976 | A1* | 5/2021 | Carmi | G06T 7/0016 |
| 2021/0158533 | A1* | 5/2021 | Cui | G06T 3/4046 |
| 2021/0166360 | A1* | 6/2021 | Kim | G06T 5/009 |
| 2021/0166383 | A1* | 6/2021 | Wang | G06V 10/776 |
| 2021/0174154 | A1* | 6/2021 | Duncan | G06K 9/6217 |
| 2021/0182589 | A1* | 6/2021 | Kim | G06N 3/04 |
| 2021/0217023 | A1* | 7/2021 | Zhou | G06V 40/171 |
| 2021/0241015 | A1* | 8/2021 | Song | G06V 40/10 |
| 2021/0295110 | A1* | 9/2021 | Ida | G06N 3/0454 |
| 2021/0335002 | A1* | 10/2021 | Wang | G06T 7/73 |
| 2021/0342620 | A1* | 11/2021 | Miura | G06V 20/588 |
| 2021/0365716 | A1* | 11/2021 | Li | G06V 10/454 |
| 2021/0365718 | A1* | 11/2021 | Hu | G06V 10/454 |
| 2022/0067514 | A1* | 3/2022 | Ida | G06N 3/0481 |
| 2022/0076002 | A1* | 3/2022 | Luo | G06V 10/82 |
| 2022/0076052 | A1* | 3/2022 | Zhang | G06K 9/6215 |
| 2022/0122729 | A1* | 4/2022 | Kim | G06N 3/0454 |
| 2022/0148328 | A1* | 5/2022 | Ye | G06V 10/809 |
| 2022/0157050 | A1* | 5/2022 | Okushiro | G06V 10/764 |
| 2022/0215294 | A1* | 7/2022 | Kingetsu | G06N 20/00 |

* cited by examiner

PROCESSING APPARATUS, PROCESSING METHOD, LEARNING APPARATUS, AND COMPUTER PROGRAM PRODUCT

CROSS-REFERENCE TO RELATED APPLICATIONS

This application is based upon and claims the benefit of priority from Japanese Patent Application No. 2020-047114, filed on Mar. 18, 2020; the entire contents of which are incorporated herein by reference.

FIELD

Embodiments described herein relate generally to a processing apparatus, a processing method, a learning apparatus, and a computer program product.

BACKGROUND

A neural network can classify an image. For example, when an intruder is detected based on an image shot by a security camera and when appearance inspection of a manufactured product is performed based on an image obtained by imaging the appearance of the manufactured product, the neural network can classify the image into "abnormal" or "not abnormal".

In the case of the intruder detection or the appearance inspection of the manufactured product, an image having an extremely large size of, for example, several thousand by several thousand pixels is given to the neural network. When such an image having the extremely large size is input to the neural network executing complicated processing, the processing amount is huge and arithmetic cost is extremely increased. To cope with this, for example, when a neural network with which a size of an image (feature map) for each channel is excessively decreased in an early layer is used, image resolution is lowered and small abnormality cannot be detected.

DETAILED DESCRIPTION

According to an embodiment, a processing apparatus includes a hardware processor. The hardware processor is configured to: cut out, from an input signal, a plurality of partial signals that are predetermined parts in the input signal; execute processing on the plurality of partial signals using neural networks having the same layer structure with each other to generate a plurality of intermediate signals including a plurality of signals corresponding to a plurality of channels; execute predetermined statistical processing on signals for each of the plurality of channels for each of the plurality of intermediate signals corresponding to the plurality of partial signals, to calculate statistics for each channel and generate a concatenated signal by concatenating the statistics of the plurality of respective intermediate signals for each channel; generate a synthetic signal by performing predetermined processing on the concatenated signal; and output an output signal in accordance with the synthetic signal.

Hereinafter, a processing apparatus 10 according to an embodiment will be described with reference to the drawings. The processing apparatus 10 can perform processing using neural networks on an input signal such as an image signal having a large size or a time-series signal with high accuracy at low cost.

First Embodiment

Figure 1:
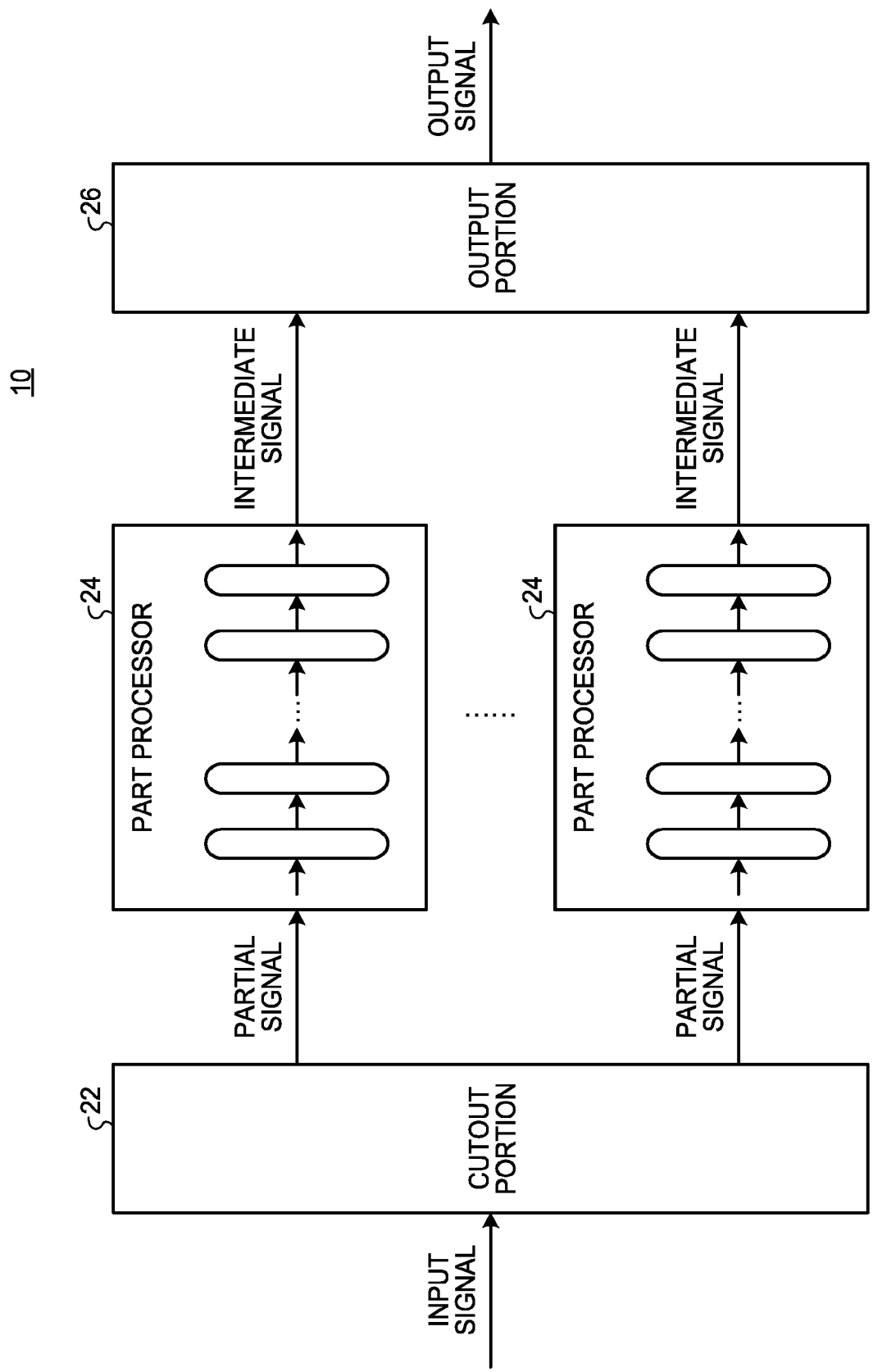
FIG. 1 is a diagram illustrating the configuration of a processing apparatus according to a first embodiment.

FIG. 1 is a diagram illustrating the configuration of the processing apparatus 10 according to a first embodiment. The processing apparatus 10 in the first embodiment executes inference processing such as class classification, signal conversion processing, or the like using neural networks.

The processing apparatus 10 includes a cutout portion 22, a plurality of part processors 24, and an output portion 26.

The cutout portion 22 receives a digital input signal. The input signal is, for example, an image signal. The image signal may be one still image or a moving image containing a predetermined number of time-series images. The input signal may be a one-dimensional time-series signal. The one-dimensional time-series signal is, for example, an audio signal for a predetermined time.

The cutout portion 22 cuts out, from the input signal, a plurality of partial signals that are different parts of the input signal. When the input signal is, for example, one still image, each of the partial signals is a partial image obtained by cutting out a predetermined part of the still image. The respective partial signals are signals of different parts of the input signal and have, for example, the same size. The respective partial signals may have different sizes. The cutout portion 22 may cut out, from the input signal, each of the partial signals so as to overlap with a part of another partial signal or so as not to overlap with another partial signal.

The part processors 24 correspond to the partial signals cut out by the cutout portion 22 one-to-one. Each of the part processors 24 acquires the corresponding partial signal among the partial signals from the cutout portion 22.

The respective part processors 24 execute processing on the corresponding partial signals using neural networks having the same layer structure to generate intermediate signals including a plurality of signals corresponding to a plurality of channels. The neural networks that the respective part processors 24 use may have the same or different parameter group(s) such as a weighting coefficient and a bias value.

The part processors 24 may be implemented by executing, by a processor, pieces of processing of the neural networks in parallel. Alternatively, the part processors 24 may be implemented by executing, by the processor, the pieces of processing of the neural networks one-by-one in a time division manner.

The configuration example and processing example of each of the part processors 24 will be further described with reference to FIG. 6, FIG. 7, and FIG. 8.

The output portion 26 acquires, from the part processors 24, the intermediate signals corresponding to the partial signals. The output portion 26 generates an output signal based on the intermediate signals and outputs the generated output signal.

To be more specific, the output portion 26 executes predetermined statistical processing on signals for each of the intermediate signals corresponding to the partial signals to calculate statistics for each of the channels. Subsequently, the output portion 26 generates a concatenated signal by concatenating the respective statistics of the intermediate signals for each channel. Then, the output portion 26 generates a synthetic signal by performing predetermined processing on the concatenated signal. The output portion 26 generates the synthetic signal by performing full connection processing on the concatenated signal, for example. The output portion 26 may generate the synthetic signal by executing statistical processing of calculating any of a maximum value, a minimum value, a median value, and an average value for the overall concatenated signal or for each part thereof, for example.

Then, the output portion 26 outputs the output signal in accordance with the synthetic signal. The output portion 26 outputs, as the output signal, a signal indicating the probability that the input signal is included in each of one or more classes, for example. The output portion 26 outputs, as the output signal, a signal that is in the same coordinate system as the input signal, and is different from the input signal.

The configuration and processing of the output portion 26 will be further described with reference to FIG. 9 and FIG. 10.

Figure 2:
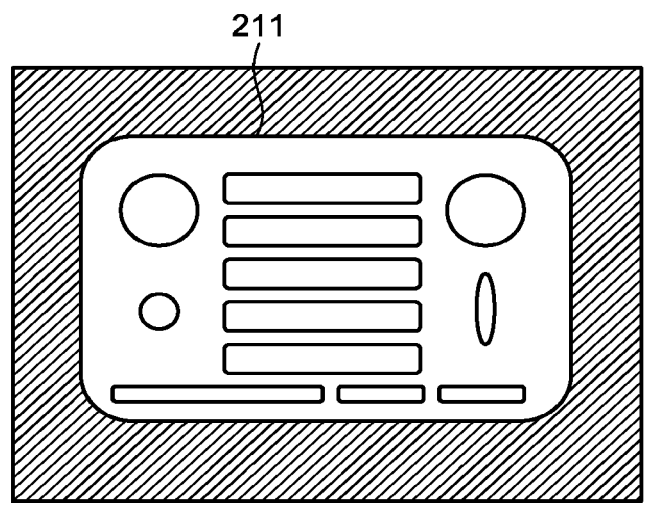
FIG. 2 is a view illustrating image data obtained by imaging a manufactured product.

FIG. 2 is a view illustrating image data obtained by imaging a manufactured product 211. The processing apparatus 10 may be used for determining whether the manufactured products 211 have abnormality in appearance inspection of the manufactured products 211 in a manufacturing line of a factory. In this case, the processing apparatus 10 acquires, as the input signal, the image data obtained by imaging each manufactured product 211 as illustrated in FIG. 2. The image data obtained by imaging the manufactured product 211 is, for example, a visible light monochrome image, a color image, an infrared image, an X-ray image, or a depth image obtained by measuring irregularities.

Figure 3:
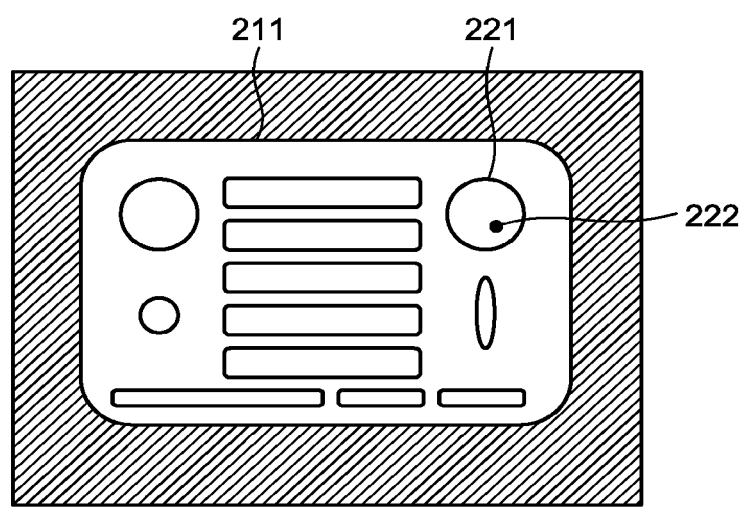
FIG. 3 is a view illustrating image data obtained by imaging the manufactured product to which a foreign matter adheres.

FIG. 3 is a view illustrating image data obtained by imaging the manufactured product 211 to which a foreign matter 222 adheres. For example, as illustrated in FIG. 3, when abnormality is present on the appearance of the manufactured product 211 like the case in which the foreign matter 222 adheres to a circular component 221, the processing apparatus 10 determines presence of abnormality. When no abnormality is present on the appearance of the manufactured product 211, the processing apparatus 10 determines no abnormality.

Figure 4:
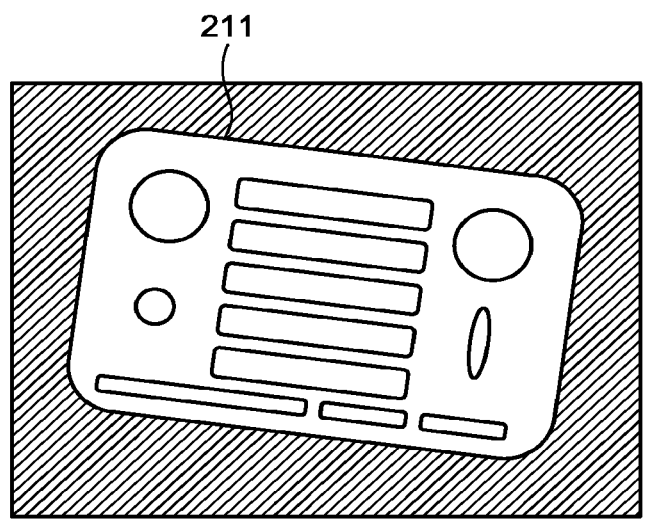
FIG. 4 is a view illustrating image data obtained by imaging the manufactured product in a displaced state.

FIG. 4 is a view illustrating image data obtained by imaging the manufactured product 211 in a displaced state. If the positions of the manufactured product 211 are the same in all the pieces of image data obtained by imaging the manufactured product 211 regardless of normality and abnormality, it is sufficient that an abnormality determination apparatus calculates difference in each pixel value between a normal product image obtained by imaging the normal manufactured product 211 and the image data obtained by imaging the manufactured product 211 as an inspection target. The abnormality determination apparatus determines the presence of abnormality when there is a portion having a large differential value.

In practice, as illustrated in FIG. 4, the manufactured product 211 is displaced, illumination intensity and image sensor sensitivity are different, or components configuring the manufactured product 211 are displaced in a range of equal to or less than allowable values, in the pieces of image data. Accordingly, pixel values fluctuate even in the pieces of image data obtained by imaging the normal manufactured product 211. The processing apparatus 10 according to the embodiment uses the neural networks to learn these fluctuations in advance and determines the presence or absence of abnormality in the manufactured product 211 with high accuracy.

Figure 5:
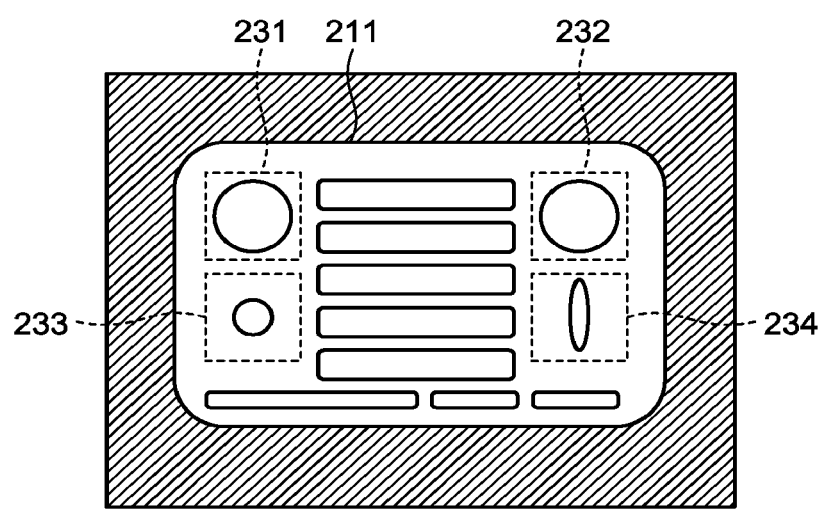
FIG. 5 is a view illustrating a plurality of partial signals included in the image data.

FIG. 5 is a view illustrating a plurality of partial signals contained in the image data. When used for determining whether the manufactured products 211 have abnormality in the appearance inspection of the manufactured products 211 in the manufacturing line of the factory, the processing apparatus 10 cuts out, as the partial signals, predetermined partial images in the image data obtained by imaging each manufactured product 211.

The processing apparatus 10 cuts out, as four partial signals, partial images 231, 232, 233, and 234 having the same size, which are rectangular portions surrounded by dotted lines in FIG. 5, for example. For example, a designer or the like previously determines the positions of the partial images 231, 232, 233, and 234 in the image data. The processing apparatus 10 may cut out a desired number of partial signals or may cut out a plurality of partial signals having different sizes or shapes.

The processing apparatus 10 executes processing using the neural networks having the same layer structure on the respective partial signals. The partial signals are, for example, partial images obtained by imaging different components and therefore have different waveform patterns. Parameter groups set to the neural networks are previously trained such that normal intermediate signals are output even when the waveform patterns of the partial signals input to the neural networks are different. Learning processing on the processing apparatus 10 will be further described with reference to FIG. 18.

Figure 6:
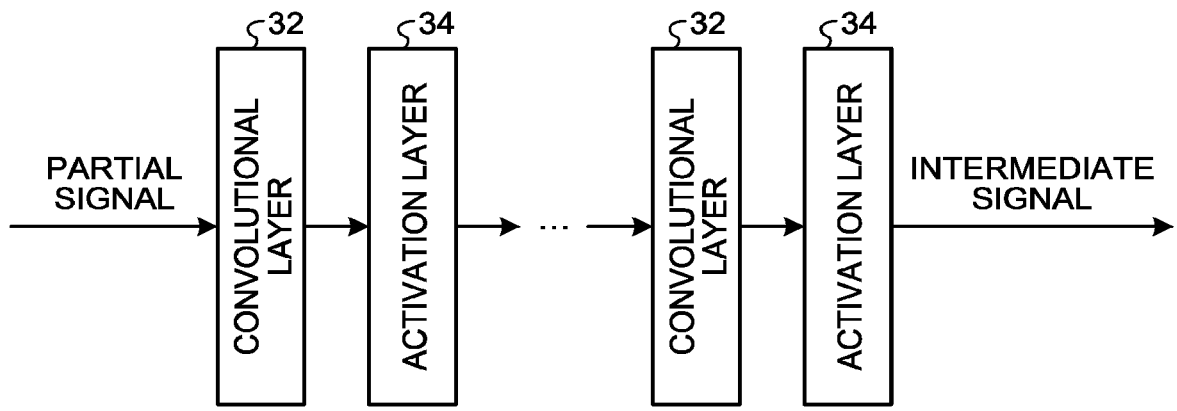
FIG. 6 is a diagram illustrating an example of a layer structure of a neural network.

FIG. 6 is a diagram illustrating an example of the layer structure of the neural network that is used in each part processor 24. When the processing apparatus 10 acquires the image data as the input signal, the part processors 24 use the neural networks each having the layer structure as illustrated in FIG. 6, as an example.

The neural network is configured by a plurality of layers. In each of the layers, a signal output from the layer at the previous stage is acquired, predetermined processing is executed on the acquired signal to generate a layer signal, and the generated layer signal is transmitted to the layer at the subsequent stage. The first one of the layers receives the partial signal from the cutout portion 22. The last one of the layers outputs the intermediate signal.

The neural network in the embodiment has, for example, a structure in which convolutional layers 32 and activation layers 34 are alternately arranged. Each convolutional layer 32 executes convolution processing on the signal acquired from the layer at the previous stage. Each activation layer 34 executes activation processing using, for example, the ReLu function on the signal acquired from the layer at the previous stage. The neural network may not include the activation layer 34 at the final stage. The neural network may not include the activation layers 34 subsequent to some convolutional layers 32 among the convolutional layers 32.

The neural network in the embodiment acquires, as the partial signal, the image data of three channels of RGB or one channel of monochrome. The neural network in the embodiment decreases stepwise the size of an image (feature map) for each channel while increasing stepwise the number of channels to several ten to several hundred channels in intermediate layers. Accordingly, the neural network in the embodiment outputs, from the last layer, the intermediate signal including a plurality of signals corresponding to the channels.

The neural network that is used in each part processor 24 may include, for example, another layer executing full connection or the like in addition to the convolutional layers 32 and the activation layers 34. The neural network that is used in the part processor 24 is not limited to such a structure and may have a desired structure as long as the intermediate signal including the channels can be output.

Figure 7:
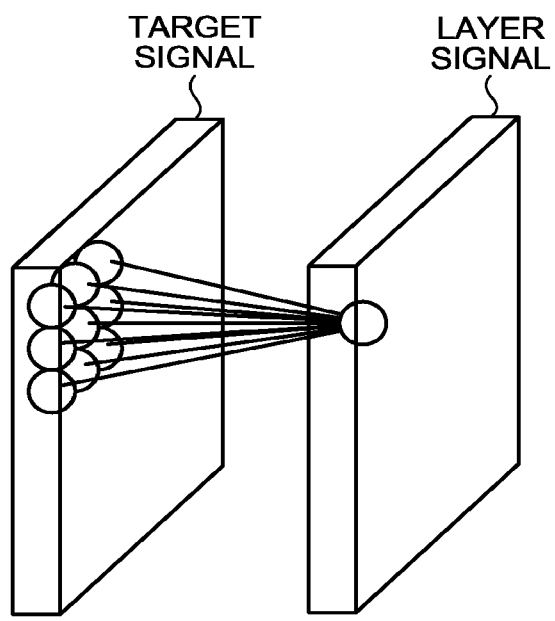
FIG. 7 is a view illustrating processing of a convolutional layer for one channel.

FIG. 7 is a view illustrating processing of the convolutional layer 32 when a target signal includes a signal corresponding to one channel. The convolutional layer 32 executes a product-sum operation for every element using a weighting coefficient group called kernel and a signal value group called window to calculate one signal value. The window is a signal value group contained in the target signal output from the layer at the previous stage and having the same size as the kernel.

The convolutional layer 32 calculates signal values at respective positions contained in the layer signal while moving the position of the window in the target signal. The convolutional layer 32 outputs the layer signal containing the thus calculated signal values. The kernel may contain a bias value in addition to the weighting coefficient group. When the kernel contains the bias value, the convolutional layer 32 calculates a signal value by adding the bias value to a product-sum operation result.

When the target signal includes the signal corresponding to one channel, for example, the kernel contains weighting coefficients that are two-dimensionally arrayed. In the example of FIG. 7, the convolutional layer 32 executes the product-sum operation using the kernel containing coefficients of 3×3 and the window containing signal values of 3×3 to calculate one signal value at a corresponding position in the layer signal.

Figure 8:
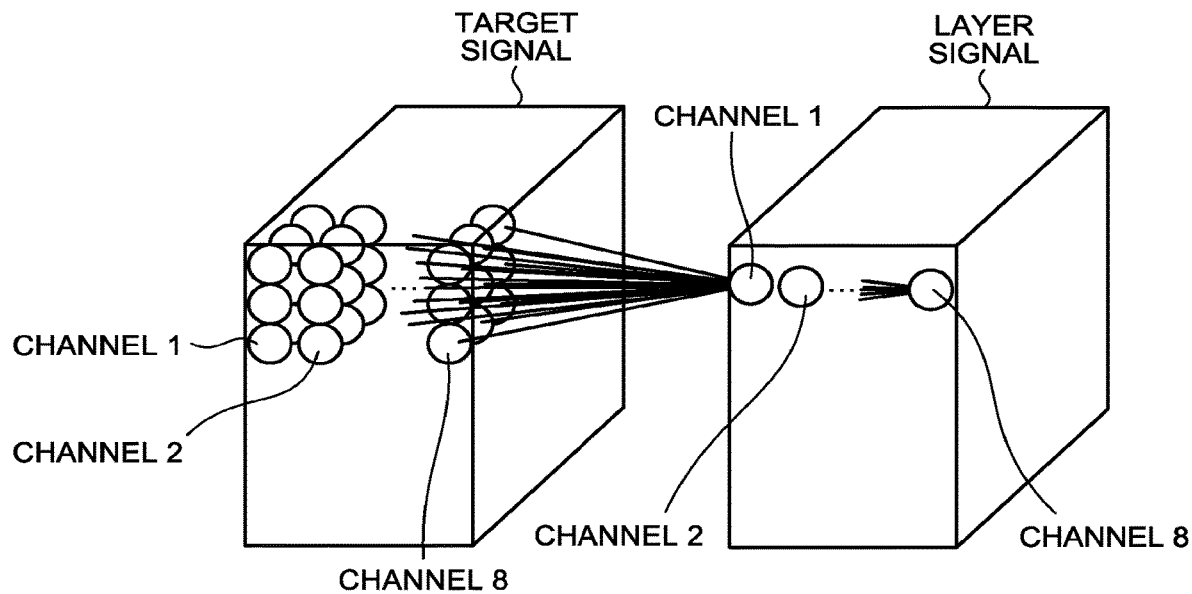
FIG. 8 is a view illustrating processing of the convolutional layer for a plurality of channels.

FIG. 8 is a view illustrating processing of the convolutional layer 32 when the target signal includes signals corresponding to a plurality of channels. When the target signal output from the layer at the previous stage contains the signals corresponding to the channels, the kernel contains weighting coefficients that are three-dimensionally arrayed.

In the example of FIG. 8, the target signal includes signals corresponding to eight channels. In the example of FIG. 8, the convolutional layer 32 executes the product-sum operation using the kernel containing coefficients of 3×3×8 and the window containing signal values of 3×3×8 to calculate one signal value at a corresponding position in the layer signal.

The convolutional layer 32 may generate a layer signal including signals corresponding to the channels. In the example of FIG. 8, the convolutional layer 32 generates the layer signal including eight signals corresponding to the eight channels. When the layer signal including the signals corresponding to the channels is generated, the weighting coefficient group and the bias value of the kernel are different for each channel to be generated. In this case, the convolutional layer 32 executes the operation while switching the kernel for each channel to be generated.

Figure 9:
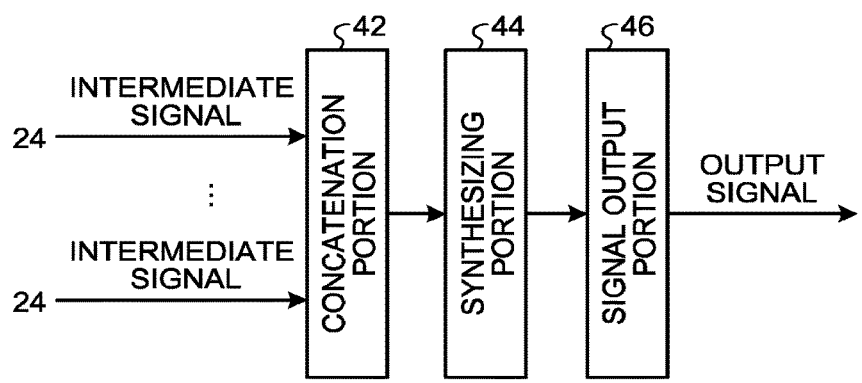
FIG. 9 is a diagram illustrating the configuration of an output portion.

FIG. 9 is a diagram illustrating the configuration of the output portion 26. The output portion 26 has a concatenation portion 42, a synthesizing portion 44, and a signal output portion 46.

The output portion 26 is implemented by a neural network including a concatenation layer, a full connection layer, and a signal output layer. In this case, the concatenation portion 42 is implemented by the concatenation layer. The synthesizing portion 44 is implemented by the full connection layer. The signal output portion 46 is implemented by the signal output layer.

The concatenation portion 42 acquires the intermediate signals from the respective part processors 24. The concatenation portion 42 executes, for each of the intermediate signals corresponding to the partial signals, predetermined statistical processing on the signals for each of the channels to calculate the statistics for each channel.

The statistics for each channel are maximum values, minimum values, median values, or average values of the signals of the corresponding channels. The statistics for each channel may be values obtained by executing a predetermined function operation on the maximum values, the minimum values, the median values, or the average values of the signals of the corresponding channels. The predetermined function operation is, for example, an operation with the sigmoid function.

Subsequently, the concatenation portion 42 generates the concatenated signal by concatenating the respective statistics of the intermediate signals for each channel. The concatenation portion 42 generates the concatenated signal by arraying the respective statistics of the intermediate signals for each channel one-dimensionally, for example.

The synthesizing portion 44 generates the synthetic signal by performing predetermined processing on the concatenated signal. The synthesizing portion 44 generates the synthetic signal by performing full connection processing on the concatenated signal, for example. To be more specific, the synthesizing portion 44 generates one or more product-sum operation values by performing product-sum operation processing of all the statistics contained in the concatenated signal and a coefficient group that has been previously calculated by learning processing. Then, the synthesizing portion 44 generates the synthetic signal containing the one or more product-sum operation values. The synthesizing portion 44 may further add, to the product-sum operation value(s), a bias value that has been previously set by learning processing. The synthesizing portion 44 may generate the synthetic signal by executing statistical processing of calculating any of a maximum value, a minimum value, a median value, and an average value for the overall concatenated signal or for each part thereof, for example.

The signal output portion 46 outputs the output signal in accordance with the synthetic signal. The signal output portion 46 generates and outputs the output signal indicating the probability that the input signal is included in each of the one or more classes based on the synthetic signal, for example. The signal output portion 46 generates and outputs the output signal in the same coordinate system as the input signal based on the synthetic signal, for example.

For example, when the processing apparatus 10 is used in the appearance inspection for the manufactured products 211 in the manufacturing line of the factory, the signal output portion 46 outputs the output signal indicating whether each manufactured product 211 has abnormality. The signal output portion 46 may output, for example, the output signal indicating the probability of presence of the abnormality in each manufactured product 211.

Figure 10:
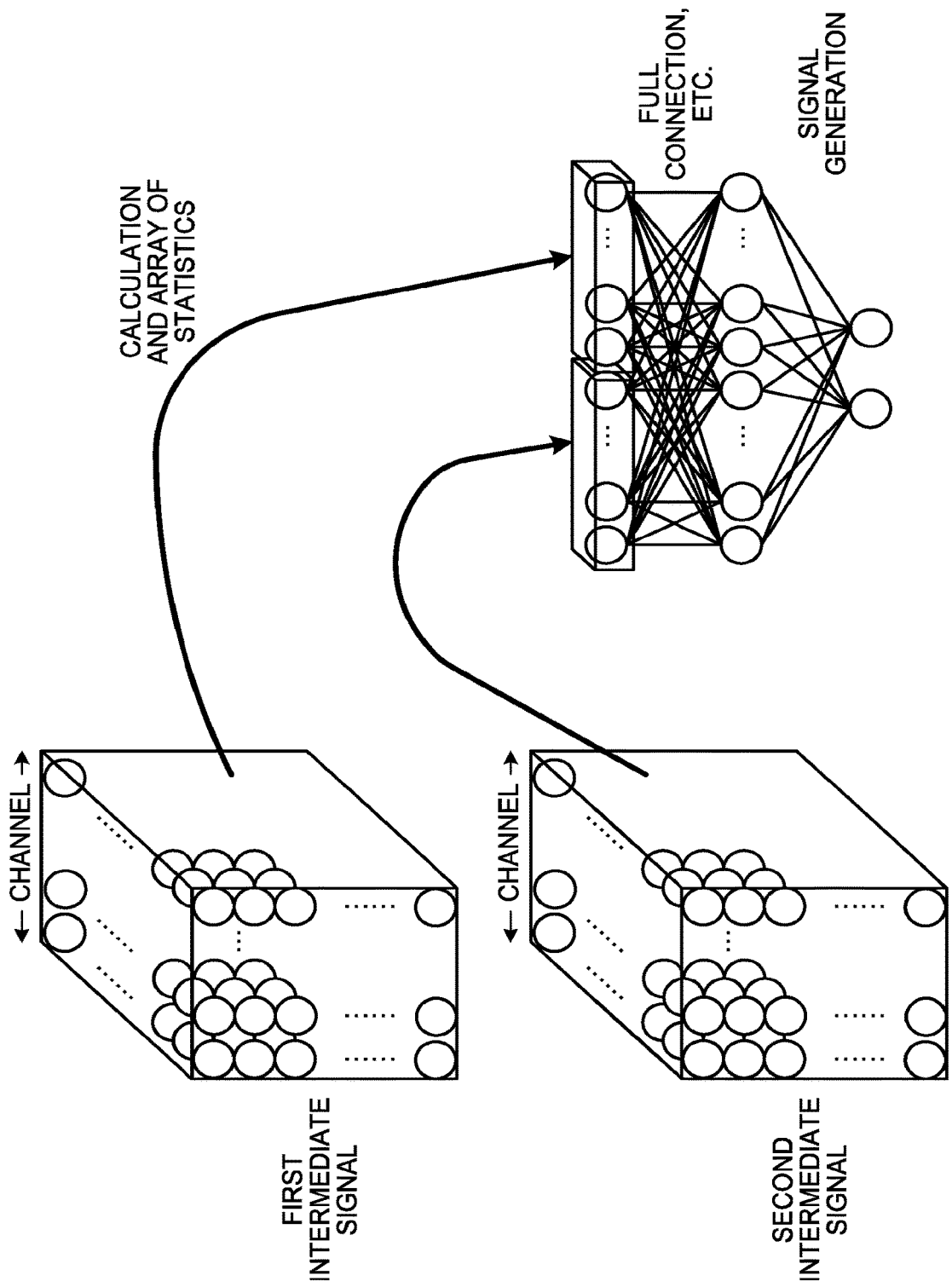
FIG. 10 is a view for explaining processing of the output portion.

FIG. 10 is a view for explaining processing of the output portion 26.

For example, it is assumed that the output portion 26 acquires two intermediate signals (a first intermediate signal and a second intermediate signal). In this case, the output portion 26 calculates statistics (for example, maximum values, minimum values, median values, or average values, or values obtained by executing the predetermined function operation on any of these values) for a plurality of signals corresponding to a plurality of channels of the first intermediate signal. The output portion 26 similarly calculates statistics for a plurality of signals corresponding to a plurality of channels of the second intermediate signal.

The output portion 26 can thereby calculate the statistics of the channels for the first intermediate signal. The output portion 26 can calculate the statistics of the channels for the second intermediate signal. The output portion 26 generates the concatenated signal by arraying these statistics in a row.

The output portion 26 generates the synthetic signal by performing the predetermined processing on the statistics contained in the concatenated signal. The output portion 26 generates the synthetic signal by fully connecting the statistics contained in the concatenated signal, for example. The output portion 26 generates the synthetic signal by performing statistical processing on the statistics contained in the concatenated signal, for example. The number of values contained in the synthetic signal may be different from the number of statistics contained in the concatenated signal.

The output portion 26 generates and outputs the output signal in accordance with the synthetic signal. The output portion 26 generates the output signal indicating the probability that the input signal is included in each of the one or more classes based on the value obtained by further fully connecting the values contained in the synthetic signal, for example. The output portion 26 may output the output signal indicating whether the input signal has the abnormality, for example. The output portion 26 may output the output signal containing the abnormality probability that the input signal has the abnormality and the normality probability that the input signal has no abnormality, for example. In this case, the output portion 26 may use the softmax processing such that each of the abnormality probability and the normality probability is equal to or more than 0 and equal to or less than 1 and the total of the abnormality probability and the normality probability is 1.

The above-mentioned processing apparatus 10 in the first embodiment cuts out the partial signals from the input signal, generates the intermediate signals including the signals corresponding to the channels using the neural networks for the respective partial signals, and generates the output signal by concatenating the intermediate signals.

The processing apparatus 10 can thereby perform processing using the neural networks having the complicated structure on the input signal having a large size without reducing the number of channels in an early layer. Furthermore, the processing apparatus 10 improves accuracy in processing processes of the neural networks by combining local processing on the signal and global processing on the signal. Accordingly, the processing apparatus 10 can perform processing on the input signal having a large size with high accuracy at low cost.

When the processing apparatus 10 is used for determining whether the manufactured product 211 has the abnormality, it can execute the processing without lowering the resolution of an image. The processing apparatus 10 can thereby detect small abnormality in the manufactured product 211.

Second Embodiment

A processing apparatus 10 according to a second embodiment has substantially the same configurations and functions of the processing apparatus 10 in the first embodiment that has been described with reference to FIG. 1 to FIG. 10. In the second embodiment, the same reference numerals denote components having substantially the same configurations and functions as those in the first embodiment and detail description of them other than different points is omitted.

Figure 11:
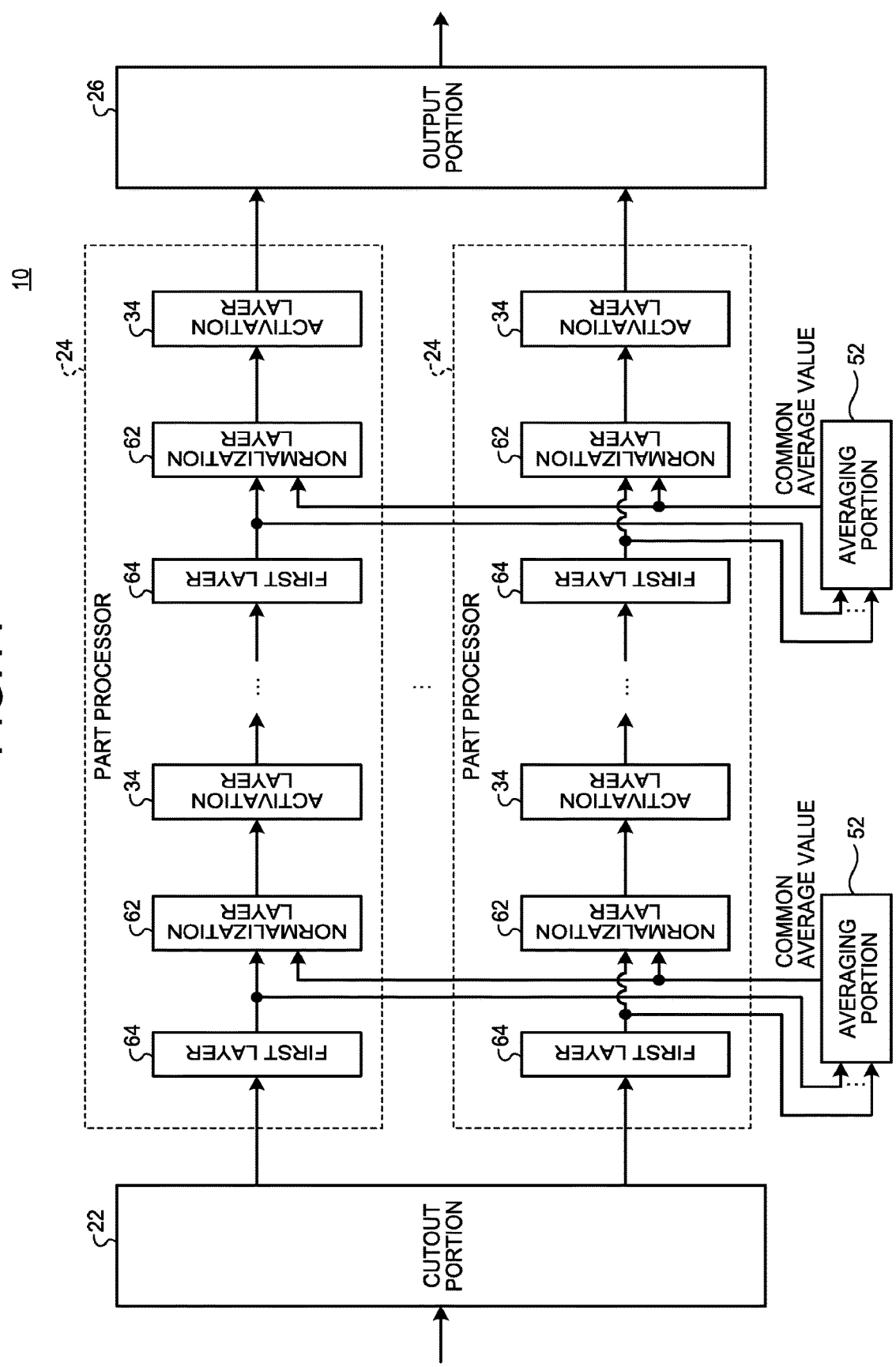
FIG. 11 is a diagram illustrating the configuration of a processing apparatus according to a second embodiment.

FIG. 11 is a diagram illustrating the configuration of the processing apparatus 10 according to the second embodiment. The processing apparatus 10 in the second embodiment further includes one or more averaging portions 52.

The neural network that is used in each of the part processors 24 in the second embodiment includes one or more normalization layers 62. Each of the one or more normalization layers 62 executes normalization processing.

The neural network includes one or more first layers 64 provided at the previous stage(s) of each of the one or more normalization layers 62. Each of the one or more first layers 64 acquires, as a first signal, a signal output from a layer at the previous stage. The first layer 64 provided at the head of the neural network in the one or more first layers 64 acquires, as the first signal, the partial signal output from the cutout portion 22.

Each of the one or more first layers 64 executes convolution processing or full connection processing on the first signal. Each of the one or more first layers 64 then outputs, as a layer signal, a signal generated by executing the convolution processing or the full connection processing.

The one or more averaging portions 52 correspond to the one or more normalization layers 62 included in the neural network one-to-one.

Each of the one or more averaging portions 52 acquires the layer signal from the first layer 64 at the previous stage of the corresponding normalization layer 62 included in the neural network that is used in each of the part processors 24. That is to say, each of the one or more averaging portions 52 acquires, from the respective part processors 24, the layer signals output from the corresponding first layers 64. Accordingly, each of the one or more averaging portions 52 acquires the layer signals.

Each of the one or more averaging portions 52 calculates a common average value by averaging the acquired layer signals. Furthermore, each of the one or more averaging portions 52 may calculate a common standard deviation as a standard deviation of the acquired layer signals.

Each of the one or more averaging portions 52 provides the common average value to the corresponding normalization layers 62 included in the neural networks that are used in the respective part processors 24. Each of the one or more averaging portions 52 may further provide the common standard deviation to the corresponding normalization layers 62.

Each of the one or more normalization layers 62 executes the normalization processing on the layer signal output from the first layer 64 at the previous stage using the common average value. For example, each of the one or more normalization layers 62 subtracts the common average value from the layer signal output from the first layer 64 at the previous stage. Furthermore, each of the one or more normalization layers 62 divides, by the common standard deviation, the layer signal obtained by the subtraction of the common average when acquiring the common standard deviation. By executing these pieces of processing, the normalization layers 62 can normalize the layer signal output from the first layer 64 at the previous stage.

A coefficient that has been previously calculated by learning processing and a shift amount that has been previously calculated by learning processing may be set to each of the one or more normalization layers 62. In this case, each of the one or more normalization layers 62 outputs a signal obtained by further multiplying, by the coefficient, the signal obtained by executing the normalization processing on the layer signal, and then, adding the shift amount thereto. Each of the one or more normalization layers 62 can thereby improve the accuracy of the output signal because the degree of freedom in setting of parameters is increased by the coefficient and the shift amount and the coefficient and the shift amount are optimized in learning.

The first layer 64 may output the layer signal including a plurality of signals corresponding to a plurality of channels. In this case, each of the one or more averaging portions 52 calculates the common average value and the common standard deviation for each channel. Furthermore, each of the one or more averaging portions 52 provides the common average value for each channel and the common standard deviation for each channel to the corresponding normalization layer 62 included in the neural networks that are used in the respective part processors 24. Each of the one or more normalization layers 62 executes the normalization processing on the layer signals for each channel using the common average value for each channel and the common standard deviation for each channel. Each of the one or more normalization layers 62 can thereby normalize the layer signals output from the first layer 64 at the previous stage for each channel.

Figure 12:
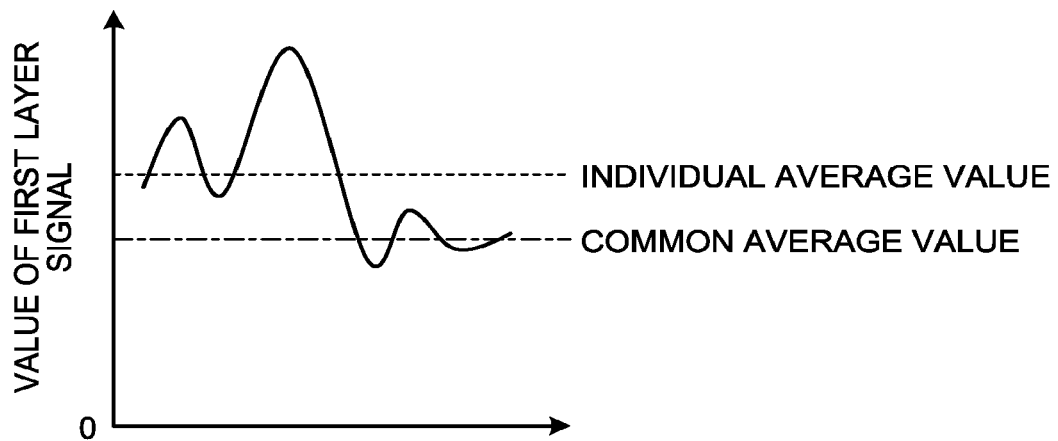
FIG. 12 is a graph illustrating an example of a first layer signal.
Figure 13:
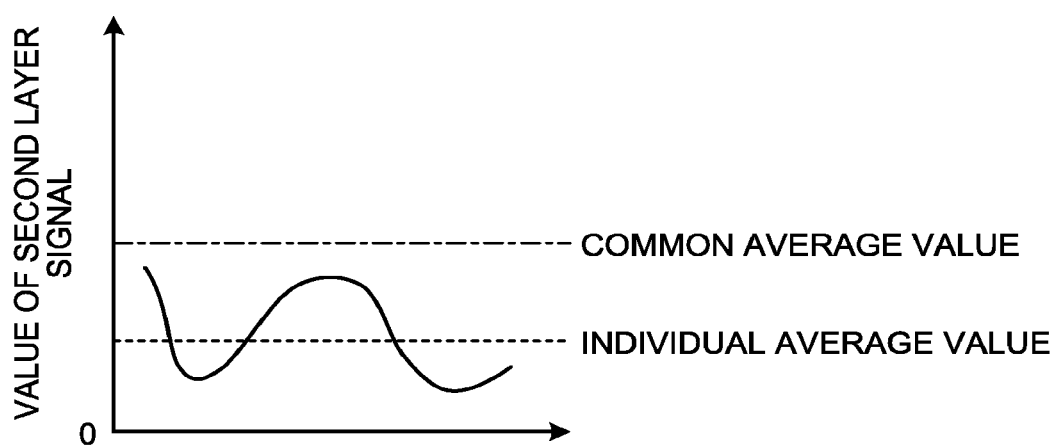
FIG. 13 is a graph illustrating an example of a second layer signal.

FIG. 12 is a graph illustrating an example of a first layer signal that is provided to the normalization layer 62 included in a first part processor 24-1 of the part processors 24. FIG. 13 is a graph illustrating an example of a second layer signal that is provided to the normalization layer 62 included in a second part processor 24-2 of the part processors 24. The first layer signal illustrated in FIG. 12 and the second layer signal illustrated in FIG. 13 are provided to the normalization layers 62 at the same positions in the neural networks.

For example, it is assumed that the processing apparatus 10 is used for determining whether the manufactured products 211 have abnormality in appearance inspection of the manufactured products 211 in a manufacturing line of a factory. In this case, for example, the processing apparatus 10 cuts out two partial images from image data obtained by imaging each manufactured product 211 to generate two partial signals.

The first layer signal is provided to the normalization layer 62 included in the neural network that performs the processing on the first partial signal of the two partial signals. The second layer signal is provided to the normalization layer 62 included in the neural network that performs the processing on the second partial signal of the two partial signals. An image is a two-dimensional signal but the first layer signal and the second layer signal are expressed by one-dimensional signals for simplification.

Even when the manufactured product 211 has no abnormality, the waveform of the first layer signal and the waveform of the second layer signal are different from each other due to difference in an exposure manner to illumination in shooting, difference in a partial shape included in the partial signal in the manufactured product 211, or the like.

The first layer signals are different among the respective manufactured products 211 due to positional deviation or the like in shooting even when the manufactured products 211 have no abnormality. Even when the positional deviation occurs in shooting, difference in the average value among the manufactured products 211 is small because the first layer signals are based on images obtained by imaging partial shapes at relatively close positions in the manufactured products 211. The same holds true for the second layer signals.

Accordingly, when the manufactured product 211 has no abnormality, each of an individual average value as an average value of the first layer signals and an individual average value as an average value of the second layer signals are kept to be constant. Even with change in a shooting environment, such as change in an overall illumination intensity, when the shooting environment is changed for the overall manufactured product 211, difference between the individual average value of the first layer signals and the individual average value of the second layer signals is highly possibly within a specific pattern.

When the abnormality is present in a portion included in one of the partial signals in the manufactured product 211 or when the abnormality is present in portions included in both of the partial signals in the manufactured product 211, the difference between the individual average value of the first layer signals and the average value of the second layer signals highly possibly deviates from the specific pattern. Accordingly, the difference between the individual average value of the first layer signals and the average value of the second layer signals is estimated to be useful information for determining whether the manufactured product 211 has the abnormality.

Figure 14:
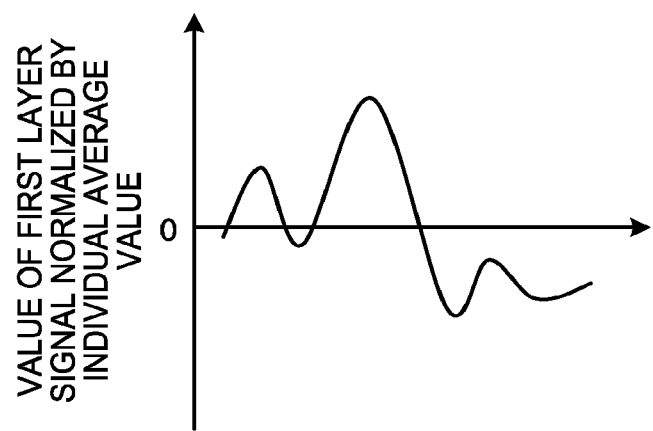
FIG. 14 is a graph illustrating an example of the first layer signal normalized by an individual average value.
Figure 15:
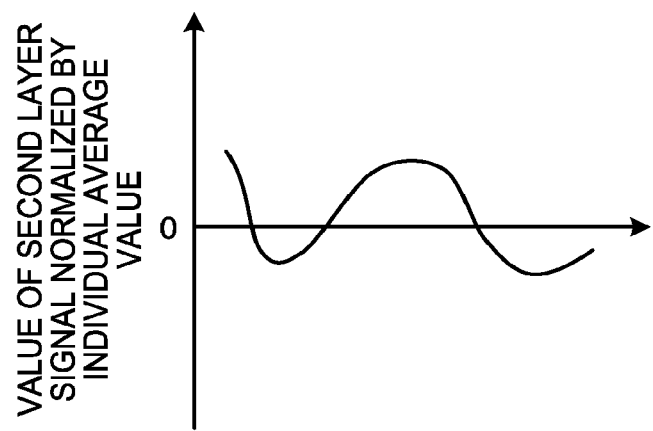
FIG. 15 is a graph illustrating an example of the second layer signal normalized by the individual average value.

FIG. 14 is a graph illustrating an example of the first layer signal normalized by the individual average value. FIG. 15 is a graph illustrating an example of the second layer signal normalized by the individual average value.

The normalization layer 62 performs the normalization processing such that the absolute value of the signal to be given to the layer at the subsequent stage is not extremely large. For example, it is assumed that each of the first layer signal and the second layer signal is normalized by the corresponding individual average value. In this case, as illustrated in FIG. 14, the first layer signals normalized by the individual average value are signals the average value of which is 0. As illustrated in FIG. 15, the second layer signals normalized by the individual average value are signals the average value of which is 0. The absolute value of the first layer signal and the second layer signal normalized by the individual average values can thereby be relatively decreased.

Difference between the average value (0) of the first layer signals normalized by the individual average value and the average value (also 0) of the second layer signals normalized by the individual average value is 0. Accordingly, when the first layer signal and the second layer signal are respectively normalized by the corresponding individual average values, information about the difference in the individual average value that is useful for determining whether the manufactured product 211 has the abnormality is lost.

Figure 16:
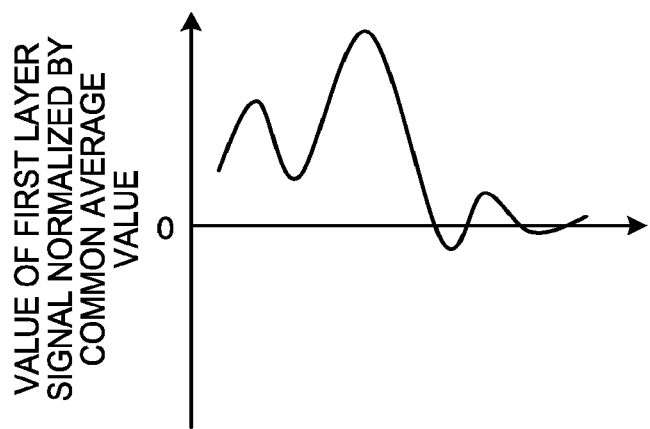
FIG. 16 is a graph illustrating an example of the first layer signal normalized by a common average value.
Figure 17:
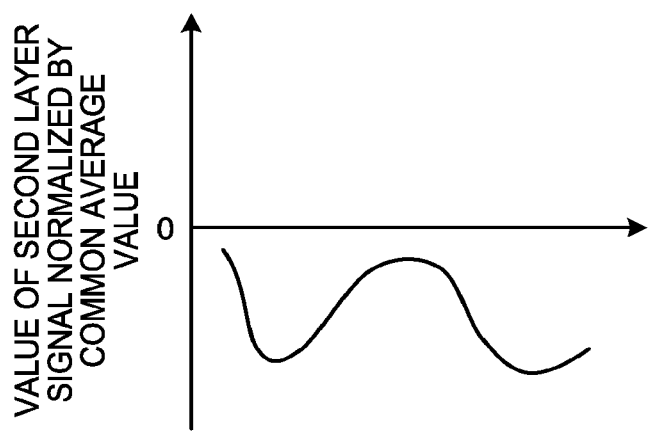
FIG. 17 is a graph illustrating an example of the second layer signal normalized by the common average value.

FIG. 16 is a graph illustrating an example of the first layer signal normalized by the common average value. FIG. 17 is a graph illustrating an example of the second layer signal normalized by the common average value.

The averaging portion 52 in the embodiment calculates the common average value by combining the first layer signals and the second layer signals. As illustrated in FIG. 16, the normalization layer 62 included in the neural network that performs the processing on the first partial signal normalizes the first layer signal by the common average value. As illustrated in FIG. 17, the normalization layer 62 included in the neural network that performs the processing on the second partial signals normalizes the second layer signal by the common average value. There is difference between an average value after normalization of the first layer signals by the common average value and an average value after normalization of the second layer signals by the common average value. The difference is estimated to be useful information for determining whether the manufactured product 211 has the abnormality.

The above-mentioned processing apparatus 10 according to the second embodiment executes the normalization processing while keeping useful information for inference processing such as class classification, conversion processing such as signal conversion processing, or the like. The processing apparatus 10 according to the second embodiment can thereby perform processing on the input signal having a large size with high accuracy at low cost.

Third Embodiment

Figure 18:
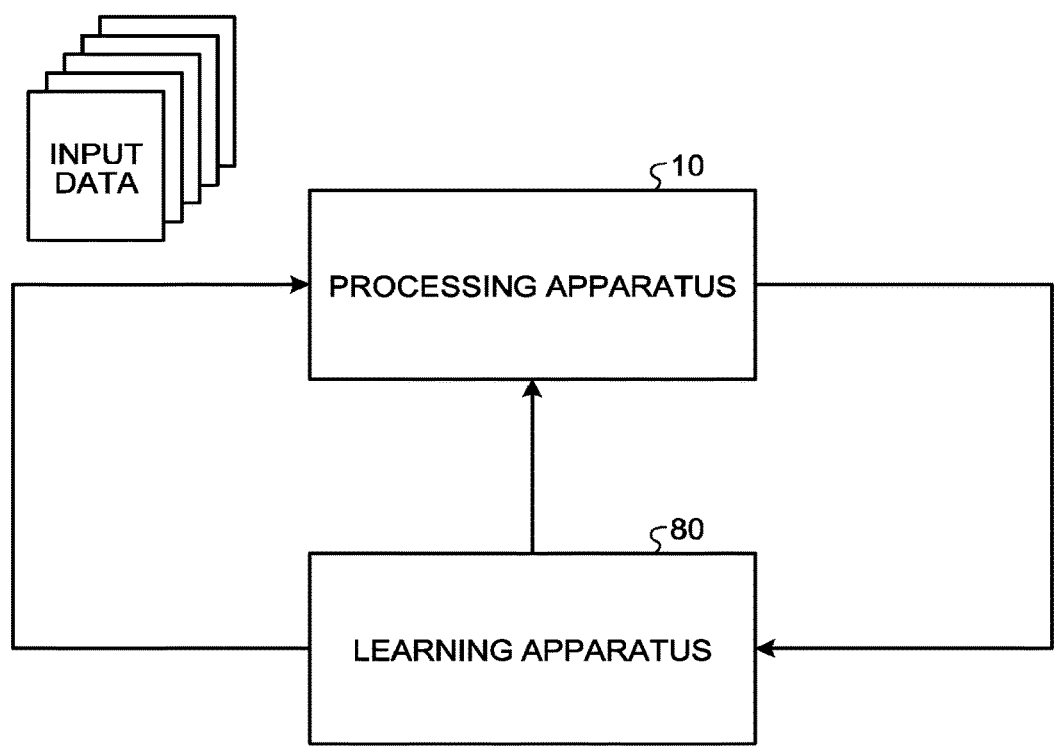
FIG. 18 is a diagram illustrating a learning system according to a third embodiment.

FIG. 18 is a diagram illustrating a learning system 70 according to a third embodiment.

The learning system 70 includes the processing apparatus 10 and a learning apparatus 80. The learning apparatus 80 in the third embodiment performs learning processing to train the parameter group included in the processing apparatus 10 that has been described in the first embodiment and the second embodiment.

For example, the learning apparatus 80 trains the parameter group set for the neural networks that the respective part processors 24 included in the processing apparatus 10 use and the parameter group set for the output portion 26 so as to optimize them. The learning apparatus 80 may train the parameter group set for the neural networks that the respective part processors 24 use so as to make values thereof common to or different among the part processors 24.

For example, the learning apparatus 80 supplies, to the processing apparatus 10, an input signal for learning for which a correct output value is known and calculates an error between an output value obtained by supplying the input signal for learning to the processing apparatus 10 and the correct value. Then, the learning apparatus 80 optimizes the parameter group set for the processing apparatus 10 by a back-propagation method so as to decrease the error.

The learning apparatus 80 may train the processing apparatus 10 by batch processing using a set of a plurality of input signals for learning. The learning apparatus 80 supplies, to the processing apparatus 10, 16 input signals for learning and acquires 16 output signals, for example. Then, the learning apparatus 80 sums up errors between the 16 output signals and the correct values, and adjusts the parameter group set for the processing apparatus 10 by the backpropagation based on the summed error. The learning apparatus 80 can thereby optimize the parameter group set for the processing apparatus 10 efficiently.

Furthermore, when the processing apparatus 10 in the second embodiment is trained, the learning apparatus 80 may execute the following processing. That is to say, the learning apparatus 80 causes the averaging portion(s) 52 to further average a plurality of common average values obtained by giving the input signals to the processing apparatus 10 in the training by the batch processing. The learning apparatus 80 then causes the averaging portion 52 to supply a value obtained by further averaging the common average values to the corresponding normalization layers 62. The normalization layers 62 execute the normalization processing using the value obtained by further averaging the common average values. The learning apparatus 80 can thereby cause the processing apparatus 10 to execute the normalization processing corresponding to the batch processing in the training by the batch processing.

The learning apparatus 80 can thereby optimize the parameter group set for the processing apparatus 10 to cause the processing apparatus 10 to operate with high accuracy as described above.

Modifications

Figure 19:
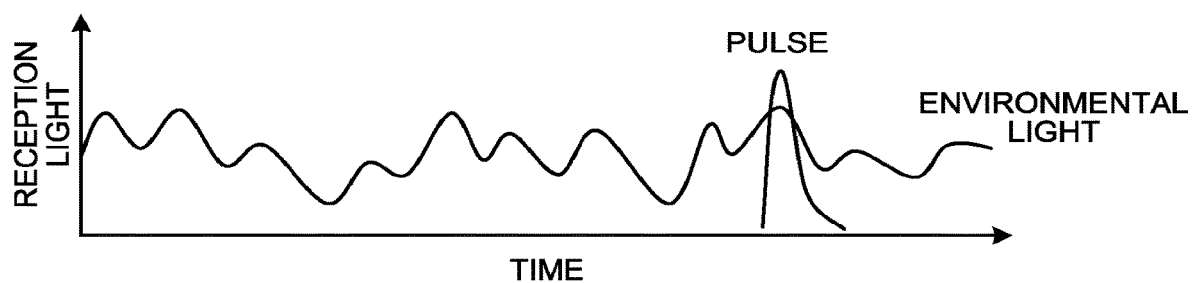
FIG. 19 is a graph illustrating an example of a time-series signal.

FIG. 19 is a graph illustrating an example of a time-series signal. In the examples of the above-mentioned embodiments, the input signal is the image data for description in some cases. Alternatively, the input signal may be a one-dimensional time-series signal. In this case, the processing apparatus 10 can classify the one-dimensional time-series signal or convert the signal.

As illustrated in FIG. 19, the input signal may be, for example, a time-varying signal of reception light measured by a distance measuring device that irradiates an objects with laser pulses and measures a distance to the object based on time taken for reflection thereof. Environmental light such as sunlight other than the reflection light of the laser pulses is mixed, as noise, into the time-varying signal of the reception light. The processing apparatus 10 can output a signal after conversion of the time-varying signal of the reflection light so as to remove noise when the learning apparatus 80 optimizes the parameter group.

Furthermore, the input signal may be image data imaged by a security camera. In this case, the processing apparatus 10 can detect intrusion of a suspicious person into a place that there are normally less people moving in and out. In particular, the processing apparatus 10 can detect the intrusion with high accuracy even when the intruder is contained as a small portion in image data obtained by imaging the place.

The processing apparatus 10 can execute inference processing such as class classification, conversion processing such as signal conversion processing, or the like on various pieces of image data and time-series data. The processing apparatus 10 can also perform processing of removing noise from image data containing noise in a part thereof. In this case, the processing apparatus 10 improves accuracy of analysis in processing processes of the neural networks for distinguishing the original signal and the noise by combining local analysis and global analysis.

Hardware Configuration

Figure 20:
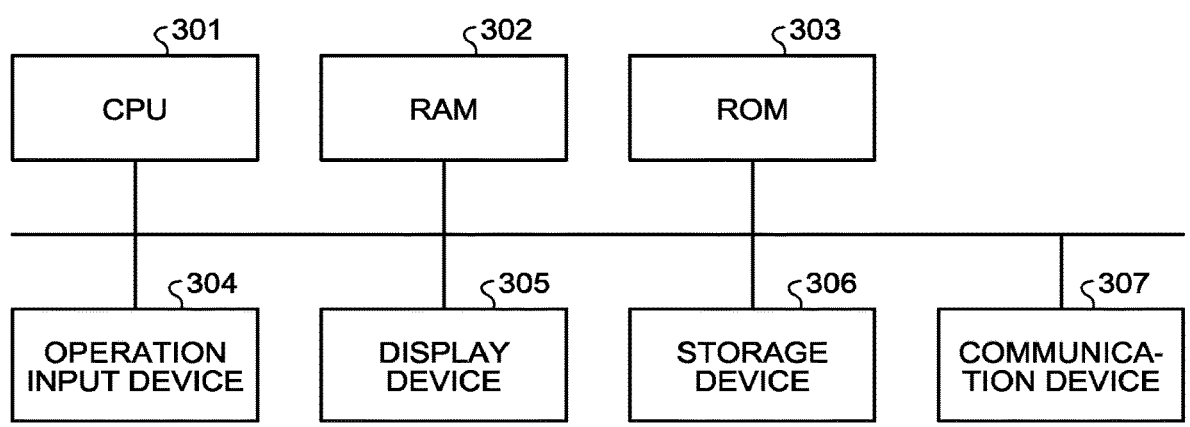
FIG. 20 is a diagram illustrating the hardware configuration of the processing apparatus.

FIG. 20 is a diagram illustrating an example of the hardware configuration of the processing apparatus 10 in the embodiment. The processing apparatus 10 is implemented by an information processing apparatus having the hardware configuration as illustrated in FIG. 20, for example. The processing apparatus 10 includes a central processing unit (CPU) 301, a random-access memory (RAM) 302, a read-only memory (ROM) 303, an operation input device 304, a display device 305, a storage device 306, and a communication device 307. These components are connected via a bus.

The CPU 301 is a processor that executes arithmetic processing, control processing, and the like in accordance with a computer program. The CPU 301 executes various pieces of processing in corporation with the computer program stored in the ROM 303, the storage device 306, or the like using a predetermined area of the RAM 302 as a work area.

The RAM 302 is a memory such as a synchronous dynamic random-access memory (SDRAM). The RAM 302 functions as the work area of the CPU 301. The ROM 303 is a memory that stores therein the computer program and various pieces of information in a non-rewritable manner.

The operation input device 304 is an input device such as a mouse and a keyboard. The operation input device 304 receives, as an instruction signal, information that is operated to be input by a user and outputs the instruction signal to the CPU 301.

The display device 305 is a display device such as a liquid crystal display (LCD). The display device 305 displays various pieces of information based on a display signal from the CPU 301.

The storage device 306 is a device that writes and reads data into and from a storage medium formed by a semiconductor such as a flash memory or a magnetically or optically recordable storage medium. The storage device 306 writes and reads data into and from the storage medium in accordance with control from the CPU 301. The communication device 307 communicates with an external apparatus via a network in accordance with control from the CPU 301.

The computer program that the processing apparatus 10 executes has a module configuration including a cutout module, a plurality of part processing modules, and an output module. The computer program causes the information processing apparatus to function as the cutout portion 22, the plurality of part processors 24, and the output portion 26 when the CPU 301 (processor) expands and executes it on the RAM 302.

The computer program that the processing apparatus 10 executes is recorded and provided in a computer-readable recording medium such as a compact disc read-only memory (CD-ROM), a flexible disk, a compact disc recordable (CD-R), and a digital versatile disc (DVD), as an installable or executable file in the computer.

The computer program that the processing apparatus 10 executes may be stored in a computer connected to a network such as the Internet and provided by being downloaded via the network. Furthermore, the computer program that the processing apparatus 10 executes may be provided or distributed via a network such as the Internet. The computer program that the processing apparatus 10 executes may be embedded and provided in the ROM 303, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing apparatus comprising:
a hardware processor configured to:
cut out, from an input signal, a plurality of partial signals that are predetermined parts in the input signal;
execute processing on the plurality of partial signals using a plurality of respective neural networks having the same layer structure with each other to generate a plurality of intermediate signals including a plurality of signals corresponding to a plurality of channels;
execute predetermined statistical processing on signals for each of the plurality of channels for each of the plurality of intermediate signals corresponding to the plurality of partial signals, to calculate statistics for each channel and generate a concatenated signal by concatenating the statistics of the plurality of respective intermediate signals for each channel;
generate a synthetic signal by performing predetermined processing on the concatenated signal; and
output an output signal in accordance with the synthetic signal.

2. The apparatus according to claim 1, wherein the hardware processor is configured to output, as the output signal, a signal indicating probability that the input signal is included in each of one or more classes.

3. The apparatus according to claim 1, wherein the hardware processor is configured to output, as the output signal, a signal that is in the same coordinate system as the input signal, and is different from the input signal.

4. The apparatus according to claim 1, wherein the input signal is an image signal.

5. The apparatus according to claim 1, wherein the input signal is a one-dimensional time-series signal.

6. The apparatus according to claim 1, wherein the statistics for each channel are maximum values, minimum values, median values, or average values of the signals of the corresponding channel.

7. The apparatus according to claim 1, wherein the statistics for each channel are values obtained by executing a predetermined function operation on maximum values, minimum values, median values, or average values of the signals of the corresponding channel.

8. The apparatus according to claim 1, wherein
the neural networks each used by one of the plurality of part processors include:
normalization layers configured to execute normalization processing; and
first layers provided at previous stages of the normalization layers, and configured to acquire first signals, and output layer signals obtained by executing convolutional processing or full connection processing on the acquired first signals,
the hardware processor is further configured to:

acquire the layer signals from the first layers at the previous stages of the corresponding normalization layers included in the neural networks, calculate a common average value by averaging the acquired layer signals; and give the common average value to the corresponding normalization layers included in the neural networks, and the normalization layers are configured to execute normalization processing on the layer signals using the common average value.

9. The apparatus according to claim 8, wherein the hardware processor is configured to:

calculate a common standard deviation as a standard deviation of the acquired layer signals, give the common standard deviation to the corresponding normalization layers included in the neural networks, and the normalization layers are configured to execute normalization processing on the layer signals further using the common standard deviation.

10. The apparatus according to claim 8, wherein the first layers are configured to output the layer signals obtained by executing the convolutional processing or the full connection processing for each channel, the hardware processor is configured to:

calculate the common average value for each channel, give the common average value for each channel to the corresponding normalization layers included in the neural networks, and the normalization layers are configured to execute the normalization processing on the layer signals for each channel using the common average value for each channel.

11. The apparatus according to claim 8, wherein the normalization layers are configured to output signals obtained by further multiplying, by a predetermined coefficient, signals obtained by executing the normalization processing on the layer signals, and then, adding a predetermined shift amount to the signals.

12. A learning apparatus that trains the processing apparatus according to claim 8, wherein the input signal includes a set of input signals for learning, the set of input signals including a plurality of input signals, and the learning apparatus comprises:

a hardware processor configured to:

train the processing apparatus by batch processing using the plurality of input signals, and in training by the batch processing, cause the processing apparatus to supply, to the corresponding normalization layers, a value obtained by further averaging a plurality of common average values obtained by giving the plurality of input signals to the processing apparatus.

13. A processing method that is executed by an information processing apparatus, the processing method comprising:

cutting out, from an input signal, a plurality of partial signals that are predetermined parts in the input signal;

in a plurality of pieces of partial processing corresponding to the partial signals one-to-one, executing processing on corresponding partial signals using a plurality of respective neural networks having the same layer structure with each other to generate a plurality of intermediate signals including a plurality of signals corresponding to a plurality of channels;

executing predetermined statistical processing on signals for each of the plurality of channels for each of the plurality of intermediate signals corresponding to the plurality of partial signals, to calculate statistics for each channel and generate a concatenated signal by concatenating the statistics of the plurality of respective intermediate signals for each channel;

generating a synthetic signal by performing predetermined processing on the concatenated signal; and outputting an output signal in accordance with the synthetic signal.

14. A non-transitory computer program product comprising a computer-readable medium including programmed instructions, the instructions causing a computer to function as:

a cutout portion configured to cut out, from an input signal, a plurality of partial signals that are predetermined parts in the input signal;

a plurality of part processors corresponding to the partial signals one-to-one and configured to execute processing on the plurality of partial signals using a pluraltiy of respective neural networks having the same layer structure with each other to generate a plurality of intermediate signals including a plurality of signals corresponding to a plurality of channels;

a concatenation portion configured to execute predetermined statistical processing on signals for each of the plurality of channels for each of the plurality of intermediate signals corresponding to the plurality of partial signals, to calculate statistics for each channel and generate a concatenated signal by concatenating the statistics of the plurality of respective intermediate signals for each channel;

a synthesizing portion configured to generate a synthetic signal by performing predetermined processing on the concatenated signal; and a signal output portion configured to output an output signal in accordance with the synthetic signal.

* * * * *